United States Patent [19]

McCaskill et al.

[11] Patent Number: 4,507,753

[45] Date of Patent: Mar. 26, 1985

[54] METHOD FOR AUTOMATIC FIELD WIDTH EXPANSION IN A TEXT PROCESSING SYSTEM DURING INTERACTIVE ENTRY OF DISPLAYED RECORD SELECTION CRITERIUM

[75] Inventors: Rex A. McCaskill; John W. McInroy; Paul D. Waldo, all of Austin, Tex.

[73] Assignee: International Business Machines Corporation, Armonk, N.Y.

[21] Appl. No.: 581,209

[22] Filed: Feb. 21, 1984

Related U.S. Application Data

[63] Continuation of Ser. No. 264,369, May 18, 1981, abandoned.

[51] Int. Cl.³ .............................................. G06F 3/14
[52] U.S. Cl. ..................................... 364/900; 340/709
[58] Field of Search ...................... 340/734, 709, 750; 364/200 MS File, 900 MS File

[56] References Cited

U.S. PATENT DOCUMENTS

| | | | |
|---|---|---|---|
| 3,618,032 | 11/1971 | Goldsberry | 364/900 |
| 3,648,245 | 3/1972 | Dodds, Jr. et al. | 364/200 |
| 3,688,275 | 8/1972 | Fredrickson et al. | 364/900 |
| 3,974,493 | 8/1976 | De Cavaignac et al. | 364/900 |
| 4,057,849 | 11/1977 | Ying et al. | 364/200 |
| 4,118,695 | 10/1978 | Ogawa et al. | 178/30 |
| 4,225,943 | 9/1980 | Busch | 364/900 |
| 4,240,075 | 12/1980 | Bringol | 340/724 |

Primary Examiner—Eddie P. Chan
Attorney, Agent, or Firm—Richard E. Cummins

[57] ABSTRACT

An improved method is disclosed for entering record selection criteria into an interactive text processing system which also processes spatially related data that is stored in vector formatted record. A qualifying frame is displayed consisting of a header row and, for example, three qualifying rows. The header row includes the field names and the qualifying rows are blank, except for the vertical lines depicting field boundaries. Selection criteria are entered into the system by positioning the cursor to the appropriate row/column intersection and entering the selection data for that field. Criterium entered in different fields in one row represent a "logical AND" selection, while criterium in different rows represent a "logical OR" situation. The improvement involves the automatic expansion of the left and right field boundaries of the selected field in both the header row and qualifying rows when more space is required to enter lengthy qualifiers, a number of qualifiers which are ORed together, or different spellings of the same qualifier. The expansion results automatically in accordance with the relationship of the end of data position to the right field boundary marker position to move repetitively the marker towards the right edge of the display, and, when additional space is required, to shift repetitively the field name and entered data to the left providing additional character positions at the right edge of the field.

8 Claims, 9 Drawing Figures

```
                1         2         3         4         5         6         7       7
      *01234567890123456789012345678901234567890123456789012345678901234567890123456789*
      *REC.ID*PATENT NO*ISSUE DATE*SERIAL NO*FILING DATE*ASSIGNEE*1st INVENTOR*2nd INVE*
   A *                                                 *IBM OR I*────────┐
   B *                                                 *IBM OR I.B.M.*───┐
   C *                                                 *IBM OR I.B.M. OR IN*──┐
   D *                                                 *IBM OR I.B.M. OR INT. BU*─┐
   E *                                                 *IBM OR I.B.M. OR INT. BUS. MA*
   F *                                         ┌───────*IBM OR I.B.M. OR INT. BUS. MAC*
   G *                                    ┌────*IBM OR I.B.M. OR INT. BUS. MACH. OR*
   H *                                ┌───*IBM OR I.B.M. OR INT. BUS. MACH. OR INTE*
   I *                              ┌─*IBM OR I.B.M. OR INT. BUS. MACH. OR INTERNATI*
   J *                          ┌───*IBM OR I.B.M. OR INT. BUS. MACH. OR INTERNATIONAL *
   K *                      ┌───*IBM OR I.B.M. OR INT. BUS. MACH. OR INTERNATIONAL BUSIN*
   L *                  ┌───*IBM OR I.B.M. OR INT. BUS. MACH. OR INTERNATIONAL BUSINESS M*
   M *              ┌───*IBM OR I.B.M. OR INT. BUS. MACH. OR INTERNATIONAL BUSINESS MACHIN*
   N *          ┌───*IBM OR I.B.M. OR INT. BUS. MACH. OR INTERNATIONAL BUSINESS MACHINES OR*
   O *      *IBM OR I.B.M. OR INT. BUS. MACH. OR INTERNATIONAL BUSINESS MACHINES OR INTE*
   P *IBM OR I.B.M. OR INT. BUS. MACH. OR INTERNATIONAL BUSINESS MACHINES OR INTERNATI*
   Q *MACH. OR INTERNATIONAL BUSINESS MACHINES OR INTERNATIONAL BUSINESS MACHINES INC.*
```

| 0 | 8 | 22 | 33 | 44 | 56 | 65 | 79 |
|---|---|---|---|---|---|---|---|
| REC.I.D. | PATENT NUMBER | ISSUE DATE | SERIAL NO. | FILING DATE | ASSIGNEE | 1st INVENTOR | 2 |
| ⓪ | ① | ② | ③ | ④ | ⑤ | ⑥ | |

B

| 0 | 8 | 21 | 34 | 46 | 59 | 72 | 79 |
|---|---|---|---|---|---|---|---|
| ASSIGNEE | 1st INVENTOR | 2nd INVENTOR | 3rd INVENTOR | 4th INVENTOR | 5th INVENTOR | PRIORIT | |
| ⑤ | ⑥ | ⑦ | ⑧ | ⑨ | ⑩ | ⑪ | |

C

| 0 | 12 | 29 | 43 | 58 | 73 | 79 |
|---|---|---|---|---|---|---|
| 5th INVENTOR | PRIORITY COUNTRY | P.O.CLASS OR. | P.O.CLASS XR.1 | P.O.CLASS XR.2 | P.O.CL | |
| ⑩ | ⑪ | ⑫ | ⑬ | ⑭ | ⑮ | |

D

| 0 | 14 | 29 | 44 |
|---|---|---|---|
| P.O.CLASS XR.2 | P.O.CLASS XR.3 | P.O.CLASS XR.4 | |
| ⑭ | ⑮ | ⑯ | |

```
                    1         2         3         4         5         6         7
          *0123456789012345678901234567890123456789012345678901234567890123456789*
          *REC.ID*PATENT NO*ISSUE DATE*SERIAL NO*FILING DATE*ASSIGNEE*1st INVENTOR*2nd INVE*

A  *                                                   *IBM OR I*
    B  *                                                   *IBM OR I.B.M.*
    C  *                                                   *IBM OR I.B.M. OR IN*
    D  *                                                   *IBM OR I.B.M. OR INT. BU*
    E  *                                                   *IBM OR I.B.M. OR INT. BUS. MA*
    F  *                                                   *IBM OR I.B.M. OR INT. BUS. MAC*
    G  *                                                   *IBM OR I.B.M. OR INT. BUS. MACH. OR*
    H  *                                         *IBM OR I.B.M. OR INT. BUS. MACH. OR INTE*
    I  *                                         *IBM OR I.B.M. OR INT. BUS. MACH. OR INTERNATI*
    J  *                                *IBM OR I.B.M. OR INT. BUS. MACH. OR INTERNATIONAL *
    K  *                           *IBM OR I.B.M. OR INT. BUS. MACH. OR INTERNATIONAL BUSIN*
    L  *                       *IBM OR I.B.M. OR INT. BUS. MACH. OR INTERNATIONAL BUSINESS M*
    M  *                 *IBM OR I.B.M. OR INT. BUS. MACH. OR INTERNATIONAL BUSINESS MACHIN*
    N  *            *IBM OR I.B.M. OR INT. BUS. MACH. OR INTERNATIONAL BUSINESS MACHIN*
    O  *      *IBM OR I.B.M. OR INT. BUS. MACH. OR INTERNATIONAL BUSINESS MACHINES OR*
    P  *IBM OR I.B.M. OR INT. BUS. MACH. OR INTERNATIONAL BUSINESS MACHINES OR INTE*
    Q  *MACH. OR INTERNATIONAL BUSINESS MACHINES OR INTERNATIONAL BUSINESS MACHINES INC.*
```

METHOD FOR AUTOMATIC FIELD WIDTH EXPANSION IN A TEXT PROCESSING SYSTEM DURING INTERACTIVE ENTRY OF DISPLAYED RECORD SELECTION CRITERIUM

This is a continuation of application Ser. No. 264,369 filed May 18, 1981, now abandoned.

DESCRIPTION

Technical Field

This invention relates in general to interactive text processing systems which process spatially related data that is stored in the system as vector formatted records and, in particular, to an improved method for displaying to the operator interactively entered field dependent record selection criterium.

RELATED APPLICATIONS

Ser. No. 264,368, filed May 18, 1981, now U.S. Pat. No. 4,435,778 is directed to a method for displaying and editing spatially related data in an interactive text processing system where the spatially related data is stored in vector format and in which one editing process is used for editing both text and file type data.

Ser. No. 264,387, filed May 18, 1981, now U.S. Pat. No. 4,435,777 is directed to an improved method for assisting an operator in defining to the interactive text processing system how spatially related data from an existing file is to be rearranged for display or copying.

Ser. No. 264,303, filed May 18, 1981, now U.S. Pat. No. 4,434,475 is directed to an interactive text processing system for spatially related data in which a qualifying frame consisting of a file header and three qualifying rows are displayed to the operator and record selection criteria are entered into appropriate fields of the qualifying rows.

PRIOR ART

A typical interactive text processing system currently operational in many office environments comprises a keyboard, a display, a printer, a diskette storage device and a microprocessor which has been programmed to cause interaction of the various system components to perform numerous text processing functions. One of the main functions of a text processing system is to create a document on the output printer which may, for example, be a single one-page letter or a multi-page manuscript. The interactive nature of the systems initially involves a query-response type mode of operation where the system displays the questions or available options to the operator and, perhaps, a number of responses. The operator then indicates the response by pressing a defined character key or by keying in the requested data. By such a procedure, the various parameters of a document format may be defined to the system. The system is then placed in the text entry mode so that actual text is keyed in by the operator and displayed on the screen in a format generally resembling that which would appear on the printed document.

It will be appreciated that the text is entered initially as a series of keystrokes, each of which is converted to a byte or character of data in the system that is subsequently stored in the memory of the microprocessor. Most keystrokes that are entered will represent characters of data and will be recognized as such by the microprocessor so that these will be transferred by the microprocessor to the display refresh buffer from which the characters will be displayed on the display screen. It will be recognized also that a limited number of keystrokes generate text format control data, such as a paragraph indent signal achieved by tabbing, or a carriage return signal. These text format bytes are recognized by the microprocessor which provides the required character control signals to the display refresh buffer. The other function of the microprocessor is to supply to the refresh buffer a cursor character signal which is displayed to the operator as an indication where the character representing the next keystroke will be displayed.

In many applications, after all the text has been entered, the operator requests a printed document from the system. The system then enters the printing mode and prints the document, employing the stored format parameters and the text. The document, as stored in memory, comprises a series of data and control characters and is generally transferred to diskette storage either before or after the document has been printed. The name of the document and the diskette number is also added to the index of documents kept by the system. This permits the document record to be subsequently retrieved.

After the printed document has been edited by the author, the operator recalls the document from diskette storage into main memory and causes it to be displayed by the system, which is placed in an update mode. The operator may then position the cursor by operation of cursor move keys to a character position on the display which is to be modified, e.g., to a word to be deleted. The operator merely presses a delete key before moving the cursor through the characters of the word by the cursor control key, and the word is erased in storage by action of the microprocessor and will, therefore, not appear in the updated document.

Those familiar with the internal operation of text processing systems employing microprocessors understand the various detailed steps that the microprocessor takes in converting a simple keystroke into a character on the display screen and to a byte of binary data in a storage location in memory while "simultaneously" controlling the position of the cursor on the display screen to assist the operator to properly format the document.

In most text processing systems, the text data is merely stored sequentially in memory as the sequence of keystrokes occurred, i.e., character data interspersed by the appropriate control data such as paragraph indents, carriage returns, line advances, etc. In many systems, the document format parameters, such as page length, left and right margins, line spacing, type font, etc., are stored independently of the text data and, hence, the text format parameters of the final document can be entirely different than the parameters employed when the text was initially entered into the system.

Sequential keystroke information storage of text data does permit the implementation of a number of different editing functions which enhance the performance and desirability of text processing systems. These functions range from the simple revision feature, such as deleting, adding or changing characters or words, to more sophisticated features, such as checking the spelling of all words in the document against a defined list of words, automatically replacing a defined word with another word at every occurrence in the document, or moving a word or phrase from one position to another position.

Text processing systems of the type described above, however, do not have the capability of easily manipulating data that is spatially related, such as data which is arranged in a matrix of rows and columns. Where it is also desirable to process spatially related data in an interactive text processing system, the prior art systems employ an entirely different set of programs for processing spatially related data. One reason for the different set of programs is that there is an advantage in storing spatially related data in a vector format since this permits data processing type of functions, i.e., sorting of record fields or repositioning of fields, by the microprocessor quite easily. Hence, since the spatially related data is stored differently in the system than text data, the simple type of editing functions which must also be done on the spatially related data have required in the past their own set of programs stored with the microprocessor.

It has been found, that considerable storage space can be saved if the display and editing processes for text data can also be used for displaying and editing data stored in a vector format, as disclosed in copending application Ser. No. 264,368, filed concurrently herewith and assigned to the assignee of the present invention. The display and editing processes for text data in that system are also employed to display and edit the spatially related data by converting a predetermined amount of the vector stored data to text data. The display and editing processes then function as if the spatially related data was really text.

In that system, all of the potential parameters of the spatial relationship of the data or coordinate system are first entered into the text processing system in a conventional query-response mode. The system then displays the header portion of the matrix showing, the field name and vertical field dividers. The system further positions the cursor at the starting position in the upper left corner, which can be defined as row 1, column 0, character position 0. Data is then entered into each column and is displayed as conventional text data, the cursor being appropriately positioned after each keystroke. The operator also has the capability of moving the cursor one character position at a time in accordance with normal text conventions. Internally, the captured keystrokes are stored in memory as conventional control characters and text data so text can be displayed in a conventional manner. The data of each row subsequently is encoded as a vector where the spatial relationship of the data in the matrix is defined, and the vector is stored for later use.

Subsequent modification of the vector is done either on the encoded vector, if the modification involves a change in the spatial relationship, or on the encoded vector, if the modification is to the actual data. An example of one modification which can be accomplished would be the relocation or repositioning in the matrix of rows in accordance with the data in one column, such as sorting or collating. Such operations in conventional text processing systems would be extremely cumbersome and time consuming, if not impossible. However, since all the data is identified spatially, it becomes a relatively simple matter for the microprocessor to identify the vector and to modify its spatial parameters in accordance with the desired changes.

In addition to the data processing type functions described in the above mentioned application, it is desirable to automatically select records of spatially related data from an existing file where selected fields of each record meet selection criteria which have been entered into the system by the operator in an interactive mode.

A limited number of prior art systems provide the operator with the ability to enter selection criteria in an interactive mode. In one known system, one example of which is the text processing system marketed by IBM since 1980 and referred to as the "Displaywriter System" the header portion of the file is displayed along with a skeleton of two rows. In that system, the cursor is positioned to the appropriate field and a selection criterium entered by the operator. Before another criterium can be ORed with the first criterium, a special function key on the keyboard must be operated to either insert a row following the first row or, if the cursor is in the second row of the display, to add an additional row so that three rows are displayed. That process is repeated until all of the field dependent record selection criteria have been entered or the system reaches a limit where no more criterium are acceptable.

In related copending application Ser. No. 264,303, filed concurrently herewith and assigned to the assignee of the present invention, an interactive text processing system displays a qualifying frame to the operator. The qualifying frame comprises a predetermined number of rows, e.g., 3, each of which can be segmented to display all fields of the record. Field dependent selection criteria are entered into the rows by positioning the cursor to the field in the first row, cursoring down to the second row to the appropriate field, and again cursoring down to the appropriate field in the third row.

Additional selection criterium are entered into the system by merely operating the cursor down key to display another row which will receive the next selection criterium. Additional rows are added by the same procedure until a maximum, e.g., 12, are displayed.

The system captures the entered selection criteria and determines the column position of the entered criterium from the cursor position.

The criteria which appear in different rows of the qualifying frame are "logically ORed" for the selection process, while criteria appearing in the same row in different fields are "logically ANDed" for the selection process. The system selects records based on criterium in the corresponding fields which compare equal, or may also be arranged to select records for relationships other than a compare equal relationship. Selected records may be merely counted, displayed to the operator, or copied as part of a new file.

In entering data into a selected field, a problem sometimes arises that the criterium that is being entered has more character positions than the title of the displayed field or the width that was assigned to the field when the file was originally created. It is also preferable to use one field in one row when entering alternate criterium in a field rather than entering the criterium in the same field in separate rows. While the system is capable of performing the logical selection process in either case, there is, as explained in the copending applications, a preference to limit the number of display qualifying rows because of the potential effect on overall system performance. It is, therefore, desirable to have the width of the selected field in the qualifying row expand as the need to enter additional keystroke generated selection criterium data into the system increases.

SUMMARY OF THE INVENTION

In accordance with the method of the present invention the width of the selected field in the qualifying row is expanded automatically as the end of the data relative to the position of the righthand boundary of the field reaches some predetermined relationship. When that relationship is detected by the system, the field width is increased to the right five character spaces until the system detects the right field boundary coinciding with the right edge of the display. At that point, the left field boundary, along with all the entered data, is either left shifted five character positions which, therefore, provides five additional character spaces at the end of the entered data for the entry of additional data, or shifted to the left edge of the screen as if the line had been horizontally segmented. The shift of five space to the left occurs in response to the system sensing a second given relationship of the end of the data to the right edge of the display and continues repeatedly until all of the selection criteria has been entered or a system defined limit has been reached. If, in either implementation, the number of characters entered exceeds the display line capacity, the initially entered data is shifted off the screen. However, the left boundary of the field title does not shift off the screen, so that the title always appears regardless of whether the initially entered data has been shifted off the screen.

It is, therefore, an object of the present invention to provide in an interactive text processing system an improved method for interactively entering selection criteria into a field of a qualifying row.

A further object of the present invention is to provide an improved method for automatically expanding the displayed width of a field in a qualifying row as a function of the position of the end of the data.

The foregoing and other objects, features and advantages of the invention will be apparent from the following more particular description of a preferred embodiment of the invention as illustrated in the accompanying drawings.

DESCRIPTION OF THE INVENTION

The improved method of the present invention will be described as embodied in a conventional text processing system, represented by the functional block system diagram shown in FIGS. 1-4. The description will not involve the details of the conventional text processing system, other than the functional aspects of such a system necessary to an understanding of the present invention. The description likewise will not involve the hardware or program details of the microprocessor other than those aspects necessary to understand a programmed implementation of the improved method of a microprocessor.

Figure 1:
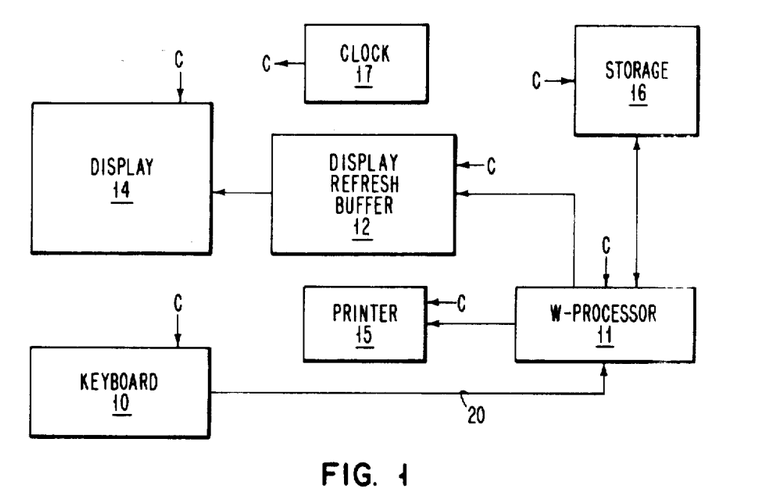
FIG. 1 is a block diagram of an interactive text processing system embodying the present invention.

With reference to the drawings, and particularly to FIG. 1, the text processing system illustrated therein comprises a keyboard 10, a microprocessor 11, a display refresh buffer 12, a display device 14, a printer 15, and an auxiliary diskette storage device 16. A clock 17, for keeping the various components of the system in synchronism, is also shown in FIG. 1 and is effectively coupled to each of the units.

Keyboard 10 comprises a normal set of graphic symbol keys such as letters, numbers, punctuation marks, and special character keys, plus text format or control keys like carriage return, indent, etc. In addition, the keyboard includes a second set of control keys for issuing special control commands to the system. The control keys include cursor movement keys, keys for setting the keyboard into a number of different modes, etc.

Figure 2:
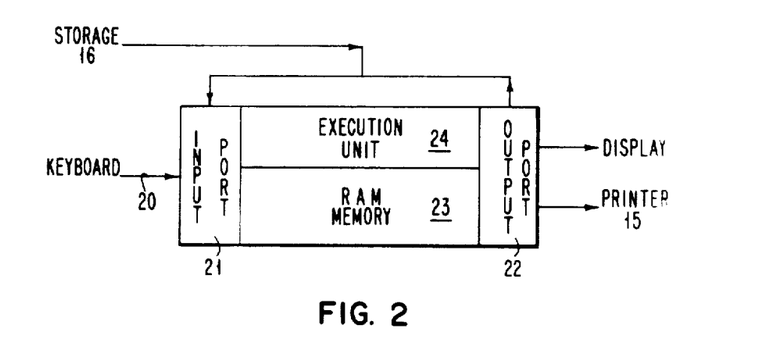
FIG. 2 is a functional diagram of the microprocessor shown in FIG. 1.

The keyboard is connected to the microprocessor by means of a bus 20. The microprocessor, as shown in FIG. 2, comprises an input port 21, an output port 22, a random access memory 23, and a process execution unit 24.

Figure 3:
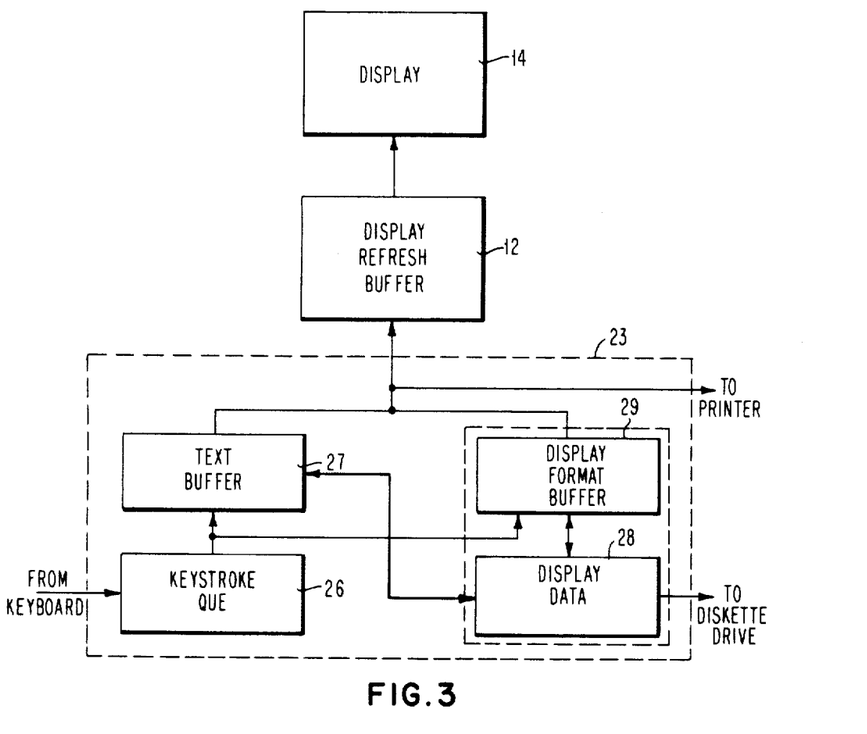
FIG. 3 is a functional diagram illustrating the data flow path between portions of the memory and the microprocessor and the display refresh buffer.

Functionally, memory unit 23 stores both instructions and data in specified sections which will be described in more detail later on in the specification. Data is entered into memory 23 from the keyboard as bytes of binary information through input port 21. As shown in FIG. 3, the section of RAM 23 which receives the keystroke data from the keyboard is designated keystroke que 26. Data to be displayed is transferred by a series of instructions from que 26 to the text buffer section 27 and then to the display refresh buffer 12 through output port 22 of the microprocessor. This is achieved in a conventional way by the microprocessor executing a series of move instructions.

The microprocessor 11 may be an INTEL model 8086 or any of the recognized functionally equivalent, currently available microprocessors.

The display refresh buffer 12 is shown as a separate buffer connected between the output port 22 and the display device 14. Buffer 12, in practice, is normally a part of the display device 14 and functions to control the generation of characters on the screen of the display device 14 by exercising on-off control of the beam as it traces a series of horizontal lines across the screen.

The output port 22 also supplies data stored in memory 23 to the printer 15 and diskette storage unit 16, each of which may have their own internal buffers which are not shown. Commands to transfer data from the random access memory 23 to the printer 15 or storage unit 16 are sent to the microprocessor by the operator from the keyboard 10.

Printer 15 may be any suitable printer known in the art. In most text processing systems, the printer is basically a standard output terminal printer having a type ball element or a daisy-wheel print element.

Diskette storage 16 may also be any suitable disk storage device which is capable of storing serial by byte data supplied to it at determined sector address locations, each of which are randomly addressable by the microprocessor to retrieve the data. Spatially related data supplied to diskette drive 16 is stored in the display data area 28 of the memory 23 in encoded form. The other section of memory 23 shown in FIG. 3 is the display format buffer area 29 which is involved in the handling of spatially related data in decoded form.

Figure 4:
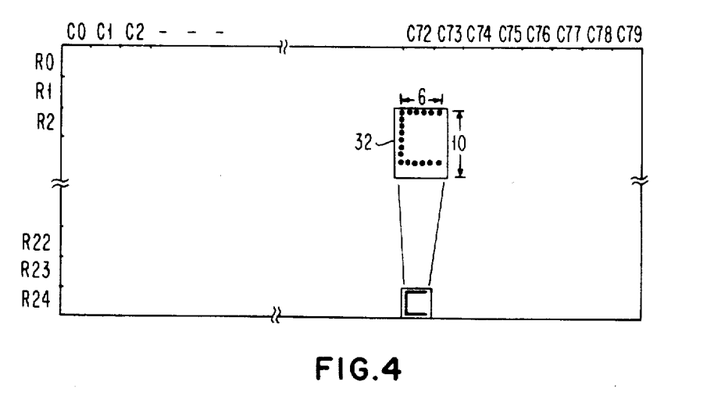
FIG. 4 is a diagrammatic view of the display shown in FIG. 1.
Figure 5:
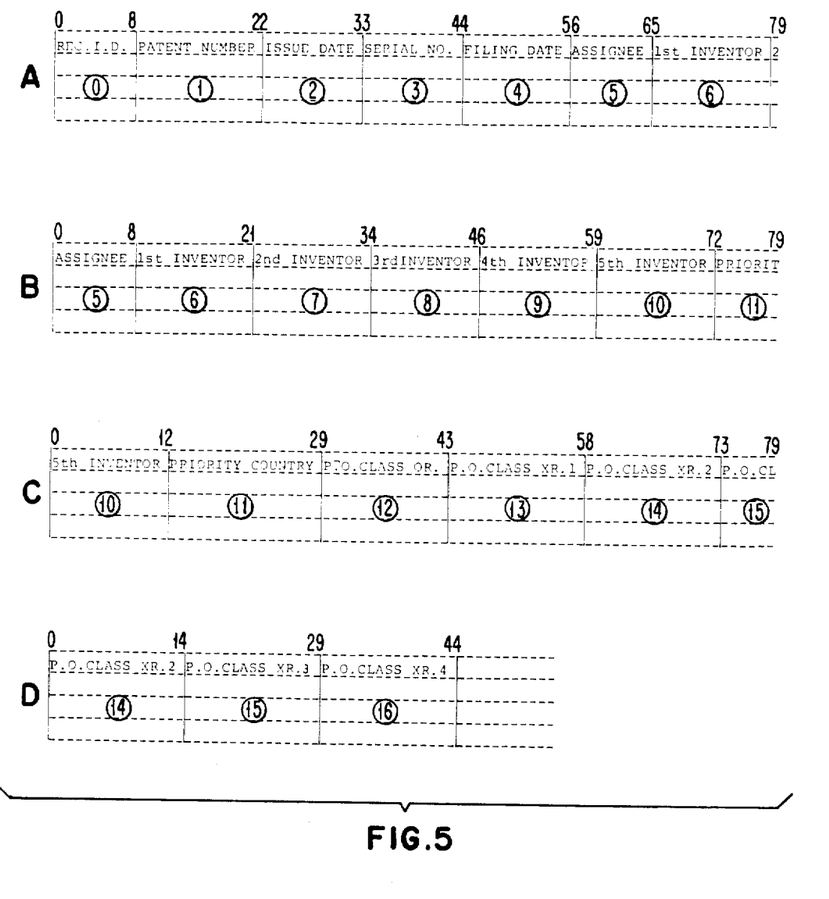
FIGS. 5a through 5d illustrate a segmented qualifying frame for a file of spatially related data that is stored in the system.

FIG. 4 is a schematic representation of the screen of display device 14. As shown in FIG. 4, the screen has, for example, the capability of displaying 25 lines of characters where each line consists of 80 character column positions. In practice, one character position consists of a matrix of dot positions or picture elements sometimes referred to as pels. A typical character matrix for a display of the type represented by device 14 would be a matrix of six wide by ten high pels, which has been designated by reference character 32 in FIG. 4. The interaction of the refresh buffer 12 and the display 14 is to convert the characters stored at a location in the buffer 12 to the corresponding character as formed in a 6×10 dot matrix at the equivalent location on the display 14. Display 14 generally is provided with its own set of electronics to achieve that conversion. The microprocessor 11 need only supply the address and load the buffer 12 with the appropriate characters.

The diskette storage device 16 also is generally provided with its own set of electronics for converting a byte of data supplied from the display data area 28 of memory 23 through the output port 22 to a serial by bit stream of data to be recorded at a predetermined sector of the one addressed concentric recording track on the diskette. Data from the device 16 is supplied to the microprocessor 11 serial by byte from the addressed sector and storage tracks when requested.

It will be understood that all of the above described functions and interactions involving the microprocessor are achieved through suitable programs which are also stored in memory 23 and which are called into operation in response to data from the keyboard 10 or interrupt signals generated by the various components of the system shown in FIG. 1.

It will be assumed that the system shown in FIG. 1 corresponds to the system shown and described in the copending application Ser. No. 264,368, filed concurrently herewith and assigned to the assignee of the present invention and that the system has stored therein spatially related data in the form of the following file description:

TABLE 1

Existing File
FILE NAME - PATENT

| Col. | | |
|---|---|---|
| 0 | Rec. ID | |
| 1 | Patent No. | |
| 2 | Issue Date | |
| 3 | Serial No. | |
| 4 | Filing Date | |
| 5 | Assignee | |
| 6 | 1st Inventor | |
| 7 | 2nd Inventor | |
| 8 | 3rd Inventor | |
| 9 | 4th Inventor | |
| 10 | 5th Inventor | |
| 11 | Priority Country | |
| 12 | P.O. Class OR | |
| 13 | P.O. Class XR.1 | |
| 14 | P.O. Class XR.2 | |
| 15 | P.O. Class XR.3 | |
| 16 | P.O. Class XR.4 | |

It will further be assumed that the file is stored in a compressed vector format on the diskette and that records are transferred from the diskette to the display data area where the record is stored in the expanded vector format. It will also be assumed, as previously described, that a "slice" of the row vector is decoded and transferred to the display format buffer in the manner described in the above-mentioned copending application.

Copending application Ser. No. 264,303 illustrates how the qualifying frame shown in FIGS. 5a through 5d segments to accommodate records having a length greater than 80 character positions and how additional selection criteria are added by adding additional rows to further qualify records in the file when needed. The related copending applications should be referred to for an understanding of the details of the basic system.

Figure 6:
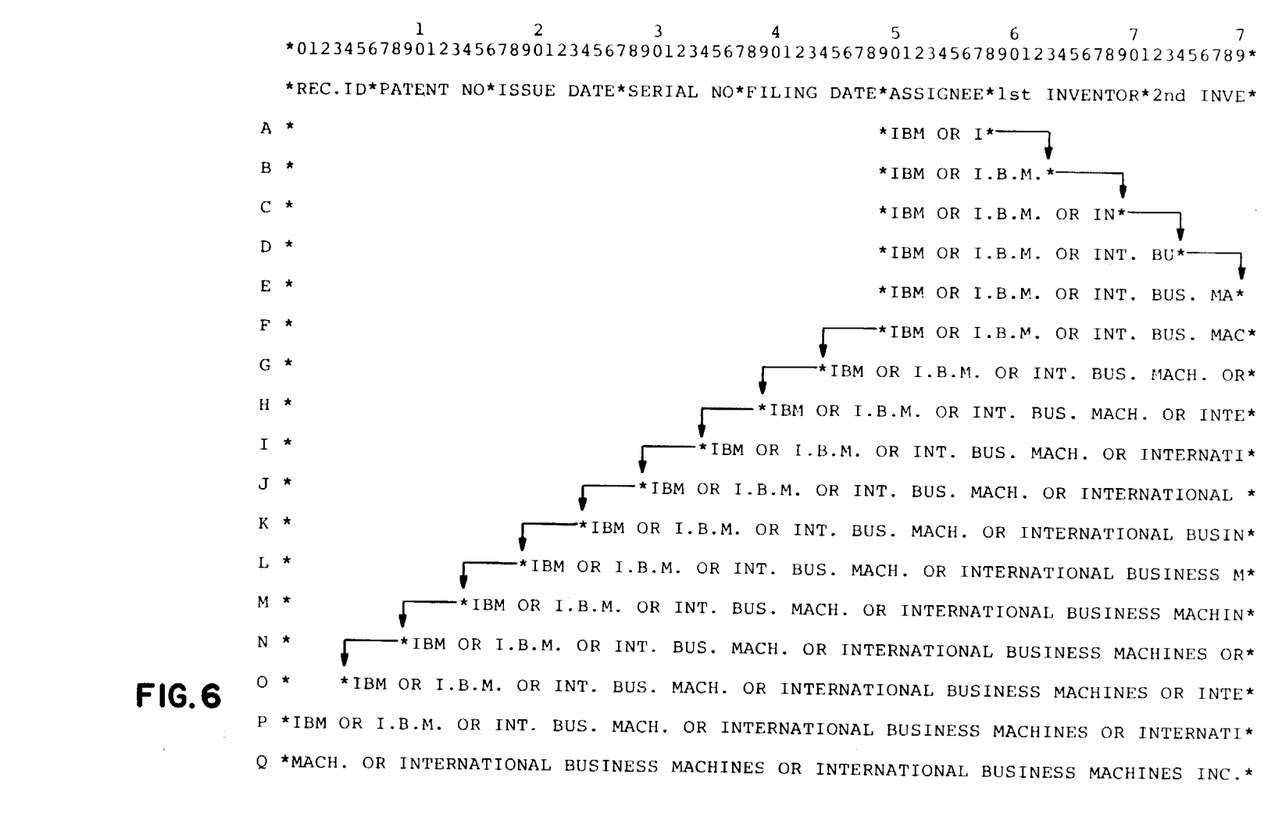
FIG. 6 illustrates the automatic field width expansion as seen on the display screen of the system shown in FIG. 1.

As shown in Table 1, each record of the file has 17 separate fields. Fields 0-6 require substantially 80 character positions on the display screen so that 7-17 are not displayed to the operator when the header and the three qualifying rows are initially placed on the screen, as shown in FIG. 6. The vector data representing the header is, however, stored in the display data area, but only the data representing the first six fields is decoded and transferred to the display format buffer. Segment B of the file shown in FIG. 5b, as comprising fields 5 through 10, would be displayed to the operator when the cursor encountered a predetermined character position in the initial frame. As shown, segment B starts at the beginning of field 5, so that fields 5 and 6 of segment A are actually repeated at the beginning of segment B. A similar situation occurs in segments B, C and D as the cursor is positioned near the end of the segment. Each time the display segments, the header and the displayed qualifying rows also segment. As mentioned earlier, the segmenting process involves rebuilding the display format buffer by decoding the appropriate portion of the row vectors stored in the display data area.

FIG. 6 illustrates the qualifying frame as it would be displayed to the operator in response to the operator having selected the task of qualifying records in the Patent file for the purpose of identifying records with the indicated criteria. It should be noted that the qualifying frame shown in FIG. 6 is displayed to the operator in response to selecting various tasks which may or may not involve displaying selected records to the operator. The function of the qualifying frame is similar, and the manner in which the selection criteria are entered into the system by the operator is the same for both situations.

As shown in FIG. 6, only one of three qualifying rows is displayed under the header row. The cursor is positioned in the first row, first field, first character position. Assume the operator is interested in selecting all records where the assignee is equal to IBM. The operator enters the selection criterium "IBM" in the assignee field by first moving the cursor horizontally in the first row until the "assignee" field is reached. The cursor "next field" key, when operated, moves the cursor from one field to the next in one move. At the assignee field, the criterium "IBM" is entered and displayed to the operator.

It should be further assumed that the data stored in the assignee fields of the records might have been enterred in the field of the record in any one of the following ways:

(1) I.B.M.
(2) Int. Bus. Mach.
(3) International Business Machines
(4) International Business Machines Inc.

The operator should, therefore, enter all the potential alternatives 1-4 above to the first criterium "IBM" as OR conditions in the assignee field. Lines A-E of FIG. 6 illustrate the appearance of the display, showing how the right margin of the assignee field is incremented by five character positions each time the end of the data is at the character position next to the right boundary.

Lines F–Q illustrate the left shift of the data and left field boundary as the alternate criteria are entered into the system. It should be understood that the "*" symbol represents a field boundary line and that the boundary lines of the other fields are displayed in each of the qualifying rows. These other field boundary lines are, therefore, shifted in the same manner as the left and right boundary lines for the assignee field were shifted. The other boundary lines have been omitted in FIG. 6 for clarity. Further, the field title "Assignee" is also shifted left when the boundary line and data in the qualifying row are left shifted. However, the field name is not shifted off the screen in those situations where the data moves off the left side of the screen.

In the left shift operation just described, it was assumed that the left boundary was shifted five character spaces. It should be appreciated that the number of spaces selected is arbitrary and that, if desired, the left shift operation may be made in one move to position the left field marker coincident with the left edge of the screen, as shown in line P of FIG. 6. Line 6P would contain the data shown in line 6F. The right boundary marker of the assignee field would be positioned at display position 36, providing five spaces for inserting additional data. The cursor is positioned at display position 31. However, the header portion to the right of the expanded right field boundary would be displayed in the normal manner since the left shift of the assignee field was, effectively, a left horizontal segmenting operation.

The field expansion, as depicted in lines A–Q of FIG. 6, is done automatically in the system of FIG. 1 in accordance with a suitable programmed implementation which is stored in the memory of the microprocessor. The program operates when the system is placed in the mode where a qualifying frame has been displayed and data, i.e., selection criterium, is entered into a selected field. It should be understood that the position of the left and right screen edges relative to the header data being displayed is stored in the system along with the position of the various field boundary markers. The current position of the cursor on the screen and in memory is controlled and monitored by the microprocessor. As a result of the necessary parameters being stored in the system, the microprocessor need only cycle through a relatively short series of program steps to decide if the field needs to be automatically expanded. The steps of such a program would be generally as follows:

(a) Determine if the system is in a record qualifying mode.

(b) If yes, determine the column number which receives the first character of data and the position of the right field boundary.

(c) After each character is entered, determine if the position of the last character of data is one less than the position of the right boundary; if no, proceed; if yes, shift the boundary five positions to the right.

(d) Determine if the new boundary position is beyond the right edge of the screen; if no, proceed; if yes, position the boundary on the right screen edge and proceed.

(e) Determine if the end of data position is equal to one less than the position of the right edge; if yes, shift the data, cursor, and field name five positions to the left and proceed.

(f) Determine if the position of the left field marker coincides with the position of the left screen edge; if not, proceed; if yes, only left shift the data in the qualifying row five positions to the left, but do not shift the header data, and proceed.

The specific program to implement the above described functional steps will, of course, vary depending on a number of factors, such as the microprocessor, the instruction set, and the arithmetical and logical capabilities of the ALU unit of the microprocessor. While the described method of automatically expanding the width of the column suggests an incremental expansion of five character positions, it should be recognized that this is arbitrary and any number could be used.

Likewise, the segmenting of the row to position the left field boundary coincident with the left screen edge to provide space for the entry of additional data will, in some situations, be preferable to incrementally left shifting the field boundary.

It should be recognized that the above described method of automatically expanding the width of a field involved in establishing selection criteria for spatially related data substantially increases operator efficiency in the next processing system and enhances the overall system performance.

While the invention has been particularly shown and described with reference to a preferred embodiment thereof, it will be undersood by those skilled in the art that various other changes in the form and details may be made therein without departing from the spirit and scope of the invention.

Having thus described our invention, what we claim as new and desire to secure by Letters Patent is:

1. In a method of interactively entering record selection criterium into an interactive text processing system which employs the same editing process for editing both text type data and spatially related file type data and which also processes spatially related data which is stored in said system as a file of vector formatted records including a header record having a plurality of named fields each having a predetermined number of character positions and a plurality of data records in which the vector format thereof establishes row and column positions of said spatially related data corresponding to said name fields and in which a qualifying frame comprising a header row of said named fields and a predetermined number of qualifying rows is displayed by said system to permit the entry of said criterium interactively by the operator of said said system converting said spatially related data to text type data prior to displaying said spatially related data to said operator system into a selected field of one of said qualifying rows, the improved method which permits entry into said selected field of selection criteria having a total number of character positions greater than said predetermined number of character positions of said selected field, said method comprising the steps of:

(a) displaying a qualifying frame to said operator including a header row and at least one qualifying row, said header row including a plurality of named fields each of which is displayed and each of which has a predetermined number of character positions;

(b) entering selection criteria in a selected one of said fields in said qualifying row;

(c) automatically expanding the displayed width of said selected field in said qualifying row whenever the total number of entered characters exceeds said number of character positions in said selected one field to permit entry of one or more said selection criteria into said one selected field, said step of automatically expanding including the step of:

(d) determining if a predetermined relationship exists between the position of each entered character of selection criteria and the end of said one selected field; and (e) converting said entered selection criteria into spatially related data (f) subsequently selecting data records stored in said system in response to an indication that at least one of said converted entered criterium matches the data stored in the corresponding field of each said selected record.

2. The method set forth in claim 1 in which said step of automatically expanding said width of said selected field in a qualifying row expands said width in increments comprising a plurality of character positions.

3. The method recited in claim 1 in which said step of determining includes the step of comparing said position of said last character of entered selection data after the entry of each said character, to the current position of said end of said selected field to determine if said selected field should be expanded.

4. The method recited in claim 3 in which said step of automatically expanding includes the step of moving said end of said selected field in each qualifying row and said header row in increments each time said determining step determines said predetermined relationship exists as said selection criterium is entered until said end of said selected field coincides with the right edge of said screen.

5. The method recited in claim 4 in which said header row includes a plurality of field names and said step of automatically expanding includes the further step of moving the beginning of said selected field in each displayed qualifying row, the field name in the header row and the selection criterium previously entered in the displayed qualifying rows towards the left edge of said screen in response to additional characters of selection criterium being entered into said selected field after said end of said selected field and said right edge obtain a coincidental relationship.

6. The method recited in claim 5 in which said step of moving said beginning includes moving said beginning in left increments comprising a predetermined number of character positions.

7. The method recited in claim 6 in which said step of moving said beginning of said selected field, said field name and said entered selection criterium towards said left edge includes the further step of moving said previously entered selection criterium off the left edge of said screen while maintaining said field name on said screen.

8. The method recited in claim 7 in which said step of moving said beginning moves said beginning in one move to coincide with said left edge of said screen as if a horizontal segmenting of the display line had occurred.

* * * * *